Sept. 20, 1955   B. DALES   2,718,325
FOOD STORAGE RECEPTACLE
Filed June 5, 1953   2 Sheets-Sheet 1

INVENTOR
BENTON DALES
ATTORNEY

Sept. 20, 1955  B. DALES  2,718,325
FOOD STORAGE RECEPTACLE
Filed June 5, 1953  2 Sheets-Sheet 2
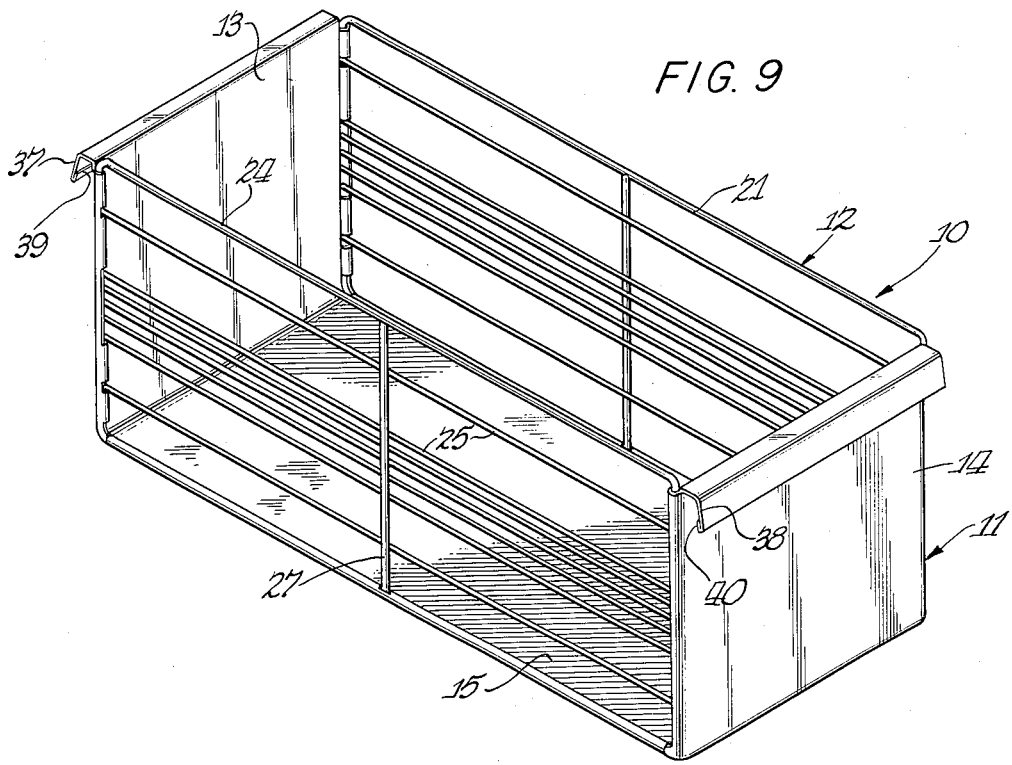
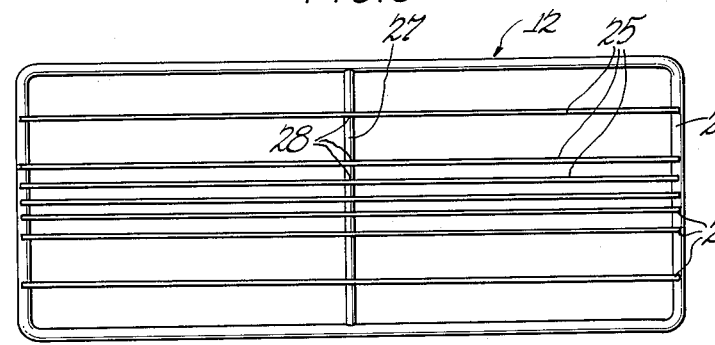
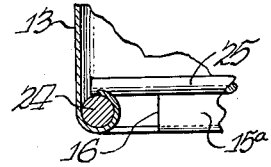
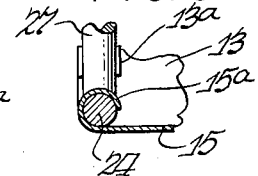
INVENTOR
BENTON DALES
Paul O. Pippel
ATTORNEY

United States Patent Office 2,718,325
Patented Sept. 20, 1955

2,718,325

FOOD STORAGE RECEPTACLE

Benton Dales, Evansville, Ind., assignor to International Harvester Company, a corporation of New Jersey Application June 5, 1953, Serial No. 359,697

7 Claims. (Cl. 220—19)

This invention relates to basket-like containers, but more specifically it is directed to food storage receptacles adapted for use in refrigerated cabinets.

Heretofore many forms and varieties of containers for storing food in the various compartments of refrigerated cabinets have been presented and used but each of these was associated with certain drawbacks or disadvantages which greatly limited their overall utility for the purposes intended. The present invention, therefore, is directed to a novel and improved container of this character which effectively overcomes the prior handicaps of similar containers, and hence it is a primary object hereof to provide an improved type of basket-like food container or receptacle that is very light in weight and simple in construction, and which, furthermore, is highly adapted for use in refrigerated cabinets.

Another object is to provide a food storage receptacle that combines the open and closed type of wall construction and wherein the side walls are of open construction so as to permit the free circulation of air through the receptacle from side to side.

A further object is to provide a receptacle or container having the front and back walls thereof fabricated of solid or imperforate closed-type construction so as to restrict the free movement of air through the receptacle from front to back and vice versa.

A still further object is to provide a receptacle that is simple to assemble and which, although it may readily be fabricated of dissimilar materials, particularly lends itself to effective decorative design features.

Another object is to provide a refrigerated cabinet food storage container or receptacle that is fabricated so as to conserve shipping space for a plurality thereof inasmuch as each receptacle may be shipped knocked down to permit nesting of many similar units into one another.

Another important object is to provide a highly effective and useful food storage receptacle that is so constructed that its walls offer very flexible design characteristics and thus it may be readily made to harmonize esthetically with many varied surroundings without in any way limiting or restricting its overall utility for storage purposes.

Other objects and advantages will be understood and will become more apparent from the following description when read in conjunction with the drawings in which:

Fig. 5 is a view of the open-type side wall panel employed in the proposed container;

Fig. 6 is a side elevational view of the assembled food container;

Fig. 7 is an enlarged dimension sectional view taken on line 7—7 of Fig. 6;

Fig. 8 is an enlarged dimension sectional view taken on the line 8—8 of Fig. 6;

Fig. 9 is an isometric view of a modified form of the proposed food container.

Figure 1:
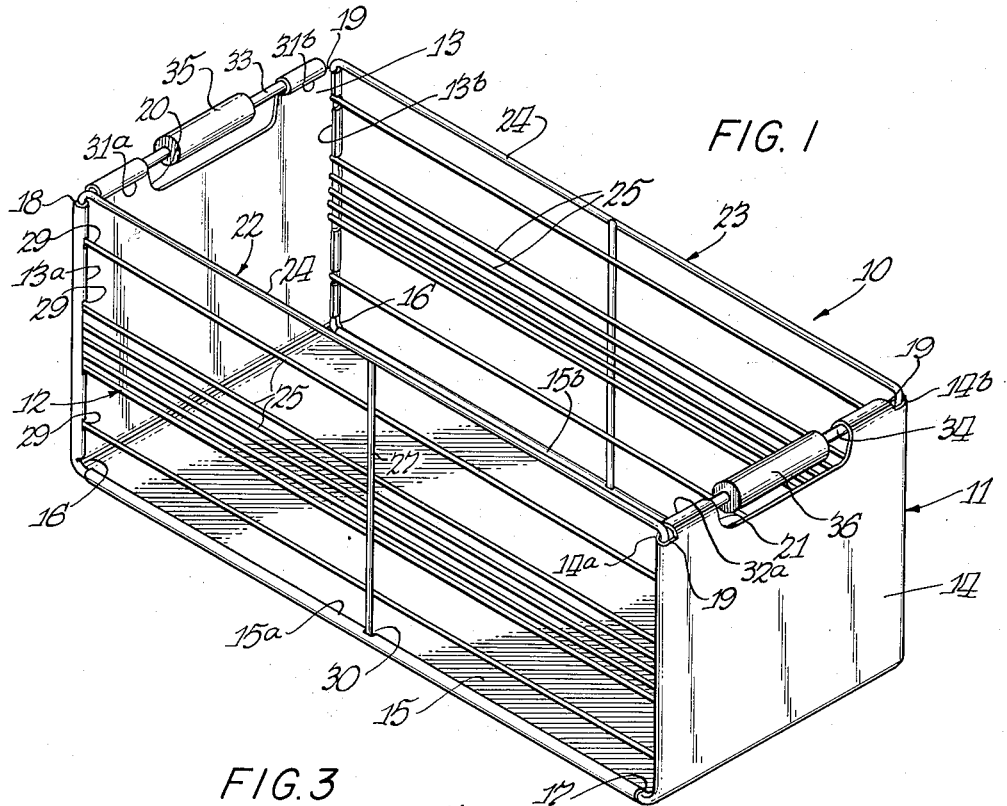
Fig. 1 is an isometric view of a preferred form of food container or receptacle according to the present invention.
Figure 4:
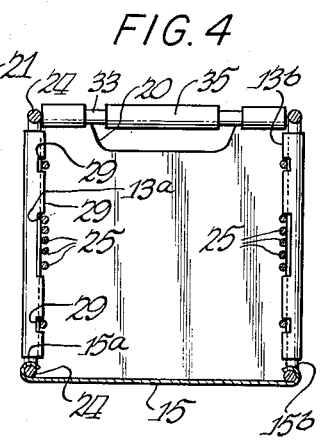
Fig. 4 is a sectional view taken on line 4—4 of Fig. 6.
Figure 3:
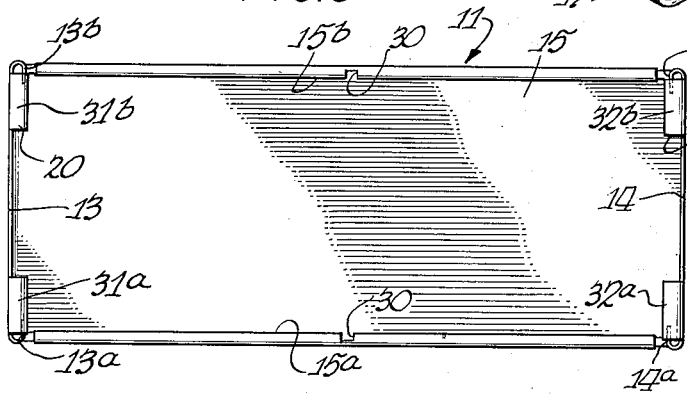
Fig. 3 is a top plan view of the food container shell shown in Fig. 2.
Figure 2:
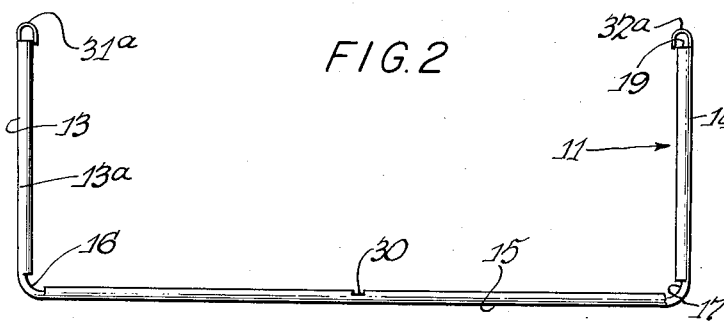
Fig. 2 is a side elevational view of the shell or cradle portion of the proposed food container shown without the side walls thereof in place.

Referring now to the drawings, it will be noted that one preferred form of the invention has been illustrated in Figs. 1–8 inclusive, and that an adaptable modification thereof has been depicted in Fig. 9. In the preferred form shown the proposed food container, indicated generally by the reference numeral 10, includes a cradle-like shell or saddle member 11 to which side panels 12 may be fixedly secured as noted hereinafter. The shell 11 may be fashioned, in one preferred form, from a solid or imperforate blank or sheet of suitable material that is fabricated in the shape of a U with opposite end sections 13 and 14 connected together by means of a bottom or center section 15. The marginal edges of these three sections are turned or formed inwardly, as by bending, rolling or otherwise, to provide inwardly extending tabs or lips along opposite edges thereof, such as the tabs 13a and 13b on section 13, tabs 14a and 14b on section 14, and tabs 15a and 15b on center section 15. The proximate tab portions such as 13a—15a and 15a—14a along one edge, and 13b—15b and 15b—14b along the opposite edge of said shell may be separated from one another by suitable means such as the cutouts 16 and 17, respectively, along opposite edges thereof and disposed adjacent corners of the cradle. These cutouts are particularly useful in facilitating the bending or forming of the end portions 13 and 14 to provide the U-shaped shell or cradle when said cradle is fashioned initially from a flat sheet or blank. Additional cutouts 18 and 19, respectively, on opposite corners of the end sections 13 and 14, and cutouts 20 and 21 likewise in said end sections, are provided for reasons which will become apparent as the description proceeds further.

Although the preferred form of the invention envisages fabricating the cradle-like shell 11 from a metallic material, it should be understood that it may also be fashioned from one of the many suitable hot-formed or post-formed plastics commercially available. For this purpose the polyester, acrylic, polyethylene, cellulose acetate and cellulose nitrate types of plastics may be advantageously used. Likewise the methacrylate type of plastic, which includes such commercial products as "Lucite," "Tenite" and "Plexiglas" are readily adaptable and effective for such uses.

The side wall panels, indicated generally by the numerals 22 and 23, are fabricated, preferably, independently of the shell-like cradle portion 11 and affixed or assembled thereto at a subsequent time. Since the panels 22 and 23 are identical in construction only one such panel will be described in detail. Each panel, preferably, is fashioned as an open grid or lattice-type structure using either metal wires or molded plastic. In the preferred embodiment illustrated the panel is fashioned as an open wire grid having a peripherally extending continuous frame member 24 to one outer plane surface of which may be affixed a plurality of spaced and longitudinally extending rod-like members 25. While any suitable conventional means may be used for securing the members 25 to the frame member 24 it has been found that spot-welding along the surface of contact of the respective members proximate the ends of the members 25, such as at 26, provides a very simple, economical and highly effective means for fixedly securing these members together. One or more stiffening or reinforcing members, such as shown at 27, may be positioned within the plane of the frame 24 and transversely disposed with respect to the longitudinal members 25 and to oppowrapped around in tightly engaging relationship adjacent portions of respective side wall frames.

4. A food storage receptacle, comprising: a shell having imperforate opposite end walls integrally fashioned with an imperforate bottom wall connected therebetween; said shell having the marginal edges of the bottom and end walls thereof inwardly turned, and further having portions thereof cut away to provide a plurality of peripherally spaced and intermittently disposed tabs and cutouts; a pair of handles, one each of which is disposed in one of the cutouts adjacent an upper end portion of each of said end walls, and having the inwardly turned tabs along the upper edge of each end wall wrapped around a portion of a respective handle to fixedly secure said handle to the respective end wall; a pair of side walls separately fashioned from said shell; each of said side walls being fashioned of lattice type construction with a continuous peripherally extending frame therearound, and having a substantial portion of the surface area of each said side wall open to the passage of air therethrough; and having certain of said inwardly turned shell tabs wrapped tightly around portions of the side wall frames with respective cutouts cooperatively straddling adjacent portions of the lattice portions of the side walls to fixedly secure said walls to said shell.

5. A food storage receptacle, comprising: a shell having imperforate opposite end walls integrally fashioned with an imperforate bottom wall connected therebetween; said shell having the marginal edges of the bottom and end walls thereof inwardly turned, and further having portions thereof cut away to provide a plurality of peripherally spaced and intermittently disposed tabs and cutouts; a pair of handles, one each of which is disposed adjacent an upper end portion of each of said end walls, including turned over and backwardly bent marginal edges on the upper edge portions of said end walls; a pair of side walls separately fashioned from said shell; each of said side walls being fashioned of lattice-type construction with a continuous peripherally extending frame therearound, and having a substantial portion of the surface area of each said side wall open to the passage of air therethrough; and having certain of said inwardly turned shell tabs wrapped tightly around portions of the side wall frames with respective cutouts cooperatively straddling adjacent portions of the lattice portions of the side walls to fixedly secure said side walls to said shell.

6. A food storage receptacle, comprising: a U-shaped shell having opposite end walls connected together by a bottom wall, and having said walls imperforate; handle means disposed adjacent upper end portions of the end walls of said shell; a pair of side walls fashioned independent of said shell; each of said side walls being fashioned of lattice-type construction with a continuous peripherally extending frame therearound, and having a substantial portion of the surface area of each said wall open to the passage of air therethrough; reinforcing means fashioned integral with the bottom and end walls of said shell, and disposed adjacent the marginal edges thereof for enhancing the rigidity of the shell; and having said reinforcing means include a plurality of tabs integrally fashioned therewith that are wrapped around adjacent portions of respective side wall frames to fixedly secure said side walls to said shell.

7. A food storage receptacle, comprising: a U-shaped sheet-like member having imperforate opposite end walls connected together by an imperforate bottom wall; independently fashioned side walls positionable between said end walls; each of said side walls being fashioned with a continuous peripherally extending frame and a plurality of members extending normally to one another across the frame and secured thereto and to each other to form a relatively rigid panel-like structure having a substantial portion of the surface area thereof open to the passage of air therethrough; and means fixedly securing said side walls to said U-shaped member including integrally fashioned portions inwardly turned along the marginal edges of said U-shaped member that additionally wrap around and engage adjacent portions of the frames of said side walls whereby the rigidity of said U-shaped member is substantially improved.

References Cited in the file of this patent

UNITED STATES PATENTS

| Re. 16,431 | Kratzer | Sept. 21, 1926 |
| 1,049,726 | Johnson | Jan. 7, 1913 |

FOREIGN PATENTS

| 17,304 | Austria | Aug. 25, 1904 |
| 113,930 | Great Britain | Mar. 14, 1918 |